United States Patent [19]

Corpron et al.

[11] Patent Number: 4,475,405
[45] Date of Patent: Oct. 9, 1984

[54] DIFFERENTIAL PRESSURE VORTEX SENSOR

[75] Inventors: Gary P. Corpron, Chanhassen; Roy E. Pagel, Richfield, both of Minn.

[73] Assignee: Rosemount Inc., Eden Prairie, Minn.

[21] Appl. No.: 357,472

[22] Filed: Mar. 12, 1982

[51] Int. Cl.³ .............................................. G01F 1/32
[52] U.S. Cl. .................................... 73/861.24; 73/720
[58] Field of Search ............................ 73/715–721, 73/861.22, 861.24

[56] References Cited

U.S. PATENT DOCUMENTS

| | | | |
|---|---|---|---|
| 3,822,596 | 7/1974 | Bonner | 73/716 |
| 3,972,232 | 8/1976 | Miller et al. | |
| 4,005,604 | 2/1977 | Herzl | |
| 4,085,614 | 4/1978 | Curran et al. | |
| 4,088,020 | 5/1978 | Sgourakes et al. | |
| 4,104,925 | 8/1978 | Caspar et al. | 73/716 |
| 4,206,642 | 6/1980 | Bearcroft | 73/861.24 |
| 4,257,277 | 3/1981 | Klobe | |
| 4,285,247 | 8/1981 | Klobe | 73/861.24 |
| 4,306,460 | 12/1981 | Sakurai et al. | 73/720 |

FOREIGN PATENT DOCUMENTS 2842557 4/1980 Fed. Rep. of Germany ... 73/861.24

Primary Examiner—Herbert Goldstein
Attorney, Agent, or Firm—Kinney & Lange

[57] ABSTRACT

A differential pressure sensor (10) adapted specifically for use with vortex shedding flowmeters which can be used in small spaces, uses a bending beam (60) for providing an electrical signal proportional to differential pressures between two oppositely facing diaphragms (40A, 40B). The diaphragms deflect under differential pressure and cause the beam (60) to be bent. The diaphragms have low mass and have a support structure (43) between them, carrying spring clips (50) which load one end of the bending beam (60). The other end of the bending beam (60) is then supported so it cantilevers from its mounting or support (61, 62) and upon movement of the diaphragms under differential pressure the beam (60) will bend. The signal can be derived by using a bending element made of a piezoelectric "bimorph" beam, which provides a voltage output as it bends, a strain gauge sensor on a beam, or an optical sensor, such as a fine fiber which deflects and provides an optical output may be used, as well as similar devices. Preferably, the sensor is a piezoelectric bimorph beam because of the direct electrical signals provided, which result from bending of the beam (60).

16 Claims, 9 Drawing Figures

DIFFERENTIAL PRESSURE VORTEX SENSOR

BACKGROUND OF THE INVENTION

1. Field of the Invention

The present invention relates to differential pressure sensors which require no "fill" fluid and can be constructed in small sizes.

2. Description of the Prior Art

In the prior art types of differential pressure sensors have been advanced, and in connection with vortex flowmeters many differential pressure sensors have been used. However, these sensors generally, are wetted type sensors (thermistors) or the sensor is hermetically sealed in a capsule, the capsule has been filled with a fluid such as an oil. In general, oil filled sensors cannot be used at high or low temperatures because of problems with differential expansion of the fluid vs. sensor components, fluid vaporization, decomposition at high temperatures, high viscosity at low temperatures and other factors. If a wetted sensor fails and has to be repaired the flow line has to be shut down so the entire flowmeter or the sensor capsule can be removed for repair.

Additionally, it has been difficult to obtain accuracy, fast response and low cost in many sensors used with vortex flowmeters. The present device provides a non-wetted (dry) sensor that does not have to be wetted by the fluid being sensed and which is made so it can be serviced without shutting down a flow line when used with a flowmeter. A prior art non-wetted sensor is shown in U.S. Pat. No. 4,005,604. This uses a magnetic dependent member sensing motions of a vibrating member which caused changes in a magnetic field.

A typical prior art differential pressure sensor used with vortex flowmeters is shown in U.S. Pat. No. 3,972,232 and in particular, FIGS. 5-8 thereof. It can be seen that the particular device requires a fill fluid and it cannot be serviced without removing the entire flowmeter from the line with which the flowmeter is used.

A flow measuring device also is shown in U.S. Pat. No. 4,257,277. The device includes pressure sensing devices that open to pressure chambers formed internally in a vortex forming body.

A substantially similar device is shown in U.S. Pat. No. 4,085,614. Also, U.S. Pat. No. 4,088,020 shows a vortex shedding flowmeter with a sensor made to be inserted into the bluff body or bar, which again requires shutting down the line for service of the sensor. However, the device shown in U.S. Pat. No. 4,088,020 is hermetically sealed and permits the bar itself to be formed of cheaper material than the sensor portions.

In general, other differential pressure sensors have utilized bending beam assemblies in larger scale versions, but in the small environment of vortex flowmeters, the problems of obtaining accurate results and still having a low cost and easily assembled sensor become substantial.

SUMMARY OF THE INVENTION

A differential pressure sensor that has a pair of diaphragms mounted in a housing open to regions between which differences in pressure are to be measured. The diaphragms carry an actuator coupled to one end of a cantilever beam. The other end of the cantilever beam is mounted to "mechanical ground" with respect to the diaphragms so that as the diaphragms shift under differentials in pressure the beam is bent. The amount of bending of the beam is sensed in a desired manner and is used for a signal indicating the occurrence and magnitude of differential pressure on the diaphragm.

In the form shown, the housing is a portion of a vortex flowmeter and thus the sensor assembly and the diaphragms are quite small. In vortex flowmeters, sensing the presence of a differential pressure that changes or shifts the diaphragms is more important than sensing the magnitude of the differential pressure. This is because the frequency of the switching of the vortices from one side of the flowmeter housing to the other is dependent upon flow rate and thus measuring when the pressure shifts from side to side of the flowmeter housing is important.

Further, it is desirable to have a sensor that can be serviced without removing the entire flowmeter from the line in which it is is used so that the flow in the line can be continued if desired during servicing. The present device permits removal of the sensor beam because the sensor chamber is hermetically sealed from the fluid being sensed and it can be removed without removing the vortex flowmeter body from the pipe or line carrying the flow.

In the preferred embodiment, the bending beam that is used with the sensor is a piezoelectric bimorph on which AC voltage signal is measured. The voltage signal changes in accordance with the direction and amount of bending of the beam. Thus, the switching of the vortices from one side to the other of the vortex flowmeter body causes a "sign" change in the signal obtained from the bimorph and provides a direct frequency output indicating the frequency of shifting or switching of the vortices.

DETAILED DESCRIPTION OF THE PREFERRED EMBODIMENTS

Figure 1:
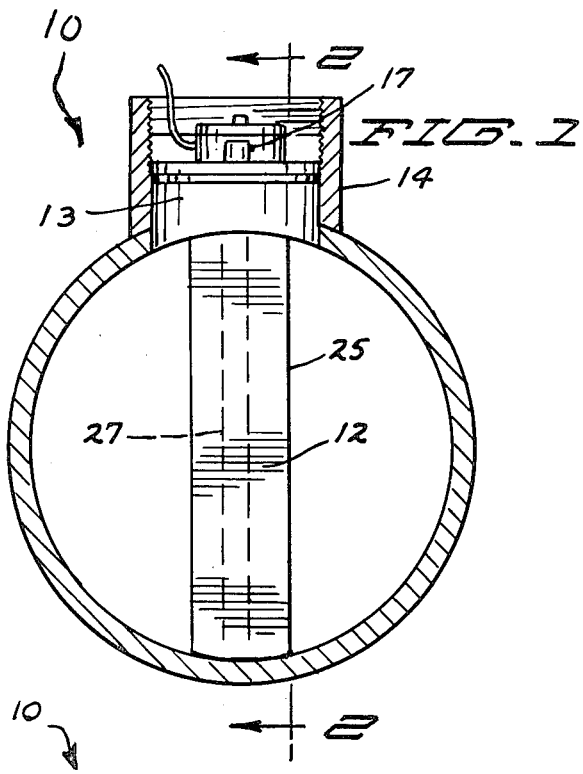
FIG. 1 is a cross sectional view of a flow line or pipe showing a vortex shedding flowmeter having a pressure sensor made according to the present invention installed therein.
Figure 2:
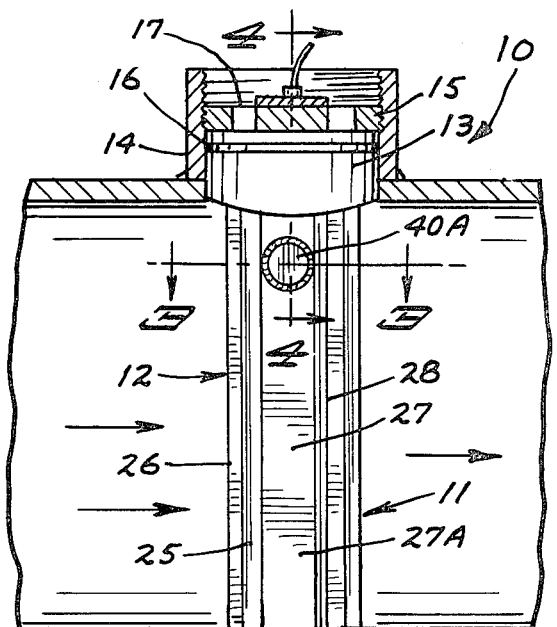
FIG. 2 is a sectional view taken generally along line 2—2 in FIG. 1.

A flow pipe or line comprising a flowmeter section is indicated at 10, and a vortex generating flowmeter for providing a measure of the flow through the pipe is indicated at 11. The flowmeter indicated at 11 is more fully described in co-pending application Ser. No. 357,465 filed Mar. 12, 1982, for Vortex Flowmeter Bluff Body which is assigned to the same assignee as this application. Flowmeter 11 includes a vortex shedding body assembly 12 that is attached to a head or support 13. The head 13 is secured in a sleeve 14 mounted on the outside of the pipe section 10. The head 13 can be secured in the sleeve in a suitable manner, for example, with a ring type nut 15 that threads into the sleeve and clamps the head 13 securely in place. The head 13 can be sealed with an O-ring 16 that prevents leakage, and in the form shown, the body assembly is held on the head with suitable cap screws 17 but may be secured by other conventional means.

Figure 3:
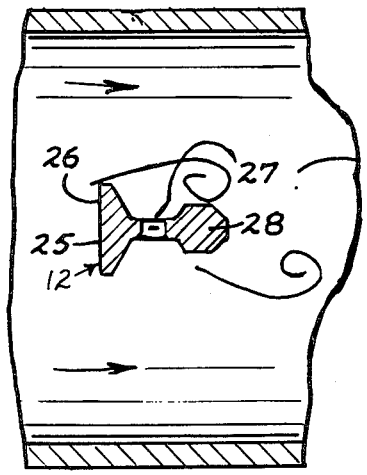
FIG. 3 is a sectional view taken generally along line 3—3 in FIG. 2.

As generally indicated in FIG. 3, the body assembly 12 has a vortex bar 25 with a forward facing surface 26, and an intermediate body section 27 as well as a tail section 28. As fluid in the pipe 10 flows past the face 26 the fluid separates and forms vortices on opposite sides of the intermediate body section 27. These vortices switch from side to side of the body section 27 and the frequency of switching depends on the rate of flow through the pipe. As the vortices switch the pressure on one side of the intermediate body section 27 will be higher than on the other until a vortex is formed on the opposite side, at which time the high pressure side becomes the low pressure side and vice versa. In order to sense the flow rate with a vortex shedding flowmeter such as is disclosed herein, the frequency of vortex formation and switching is sensed and because the vortices switch, the frequency of switching of the higher pressure from one side of the intermediate body section 27 to the other indicates the rate of flow. As vortex shedding causes the high pressure to switch from one side to the other of intermediate body section 27 the differential pressure changes significantly from one side to the other and it is this differential pressure that is being sensed in a vortex shedding flowmeter.

Figure 4:
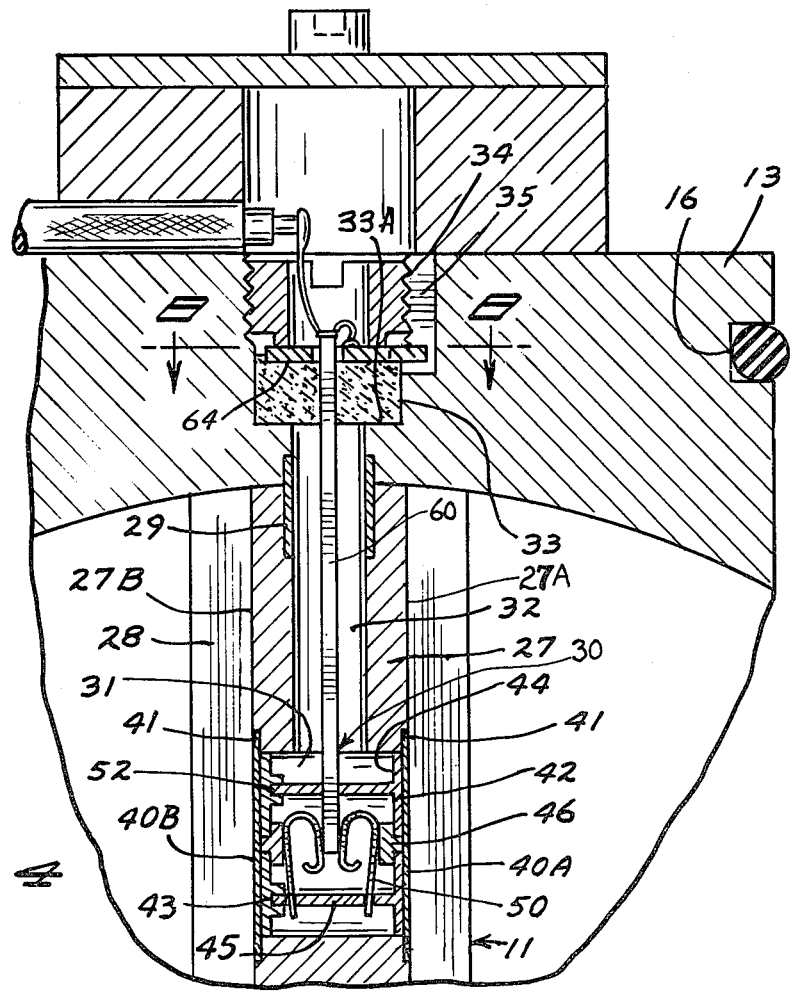
FIG. 4 is an enlarged sectional view taken generally along line 4—4 of FIG. 2 showing the details of the differential pressure sensor made according to the present invention.
Figure 5:
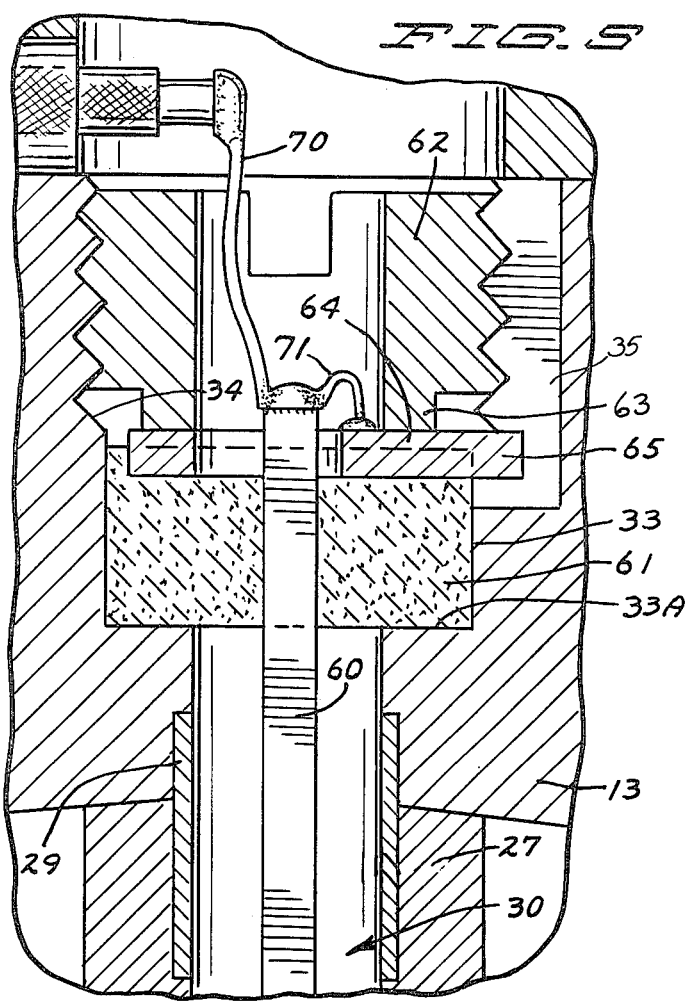
FIG. 5 is an enlarged sectional view taken generally along the same line as FIG. 4 and showing the upper mounting portion of the sensor.
Figure 8:
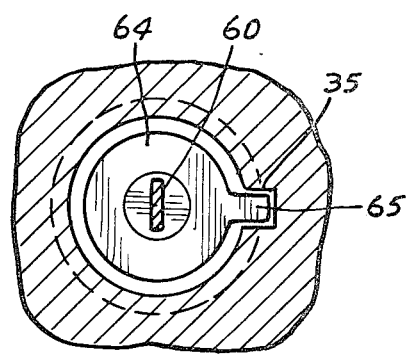
FIG. 8 is a fragmentary sectional view taken as on line 8—8 in FIG. 4.

As shown in FIG. 4, for example, a pressure sensor assembly is indicated at 30, and the intermediate body section 27 of the vortex shedding flowmeter forms the pressure sensor housing. This housing, as it will be termed, has a first cross bore indicated at 31 therein which extends from one side of the housing or body section 27 to the other. Bore 31 is a throughbore, so that the opposite side surfaces 27A and 27B are connected by this bore. Additionally, there is a longitudinally extending counterbore 32 that communicates with the bore 31, and extends laterally therefrom to the end of the body 11 and up into the head member 13 forming a part of the flowmeter assembly. A tube 29 forms a junction sleeve for bore 31 between the body 11 and head 13. Bore 31 then opens into a larger, coaxial bore portion 33. The upper end of the bore portion 33 has internal threads indicated at 34 defined therein. Additionally, a slot 35 is formed along one side edge of the bore portion 33 for purposes that will be explained as the description proceeds.

The openings on the side surfaces 27A and 27B for bore 31 are surrounded at both ends of bore 31 by peripheral shallow recesses or faces into which a pair of stainless steel, elastic, deflectable diaphragms indicated at 40A and 40B are placed. When fully assembled these diaphragms 40A and 40B are welded around their peripheries as indicated at 41, so that the interior of the bore 31 is hermetically sealed from the pipe 10 and the interiors of the bores 31 and 32 are kept isolated from any fluid or liquid that may be flowing in the pipe 10. In other words, sensor 30 is a "dry" sensor, as opposed to a fluid filled differential pressure sensor.

One of the requirements for satisfactory use is that the inertia of any sensor used in a flowmeter be kept low when sensing differential pressures, particularly when the frequency is relatively high, because as the frequency increases, the diaphragms have to deflect back and forth more quickly as the vortices switch. In order to transmit the diaphragm deflection movement from diaphragms 40A and 40B, respectively, a motion transmitting and diaphragm support assembly indicated at 42 is utilized in a first form of the invention. To keep the motion transmitter assembly light, it is made primarily of aluminum.

It should also be noted that the motion of the diaphragm indicating differential pressure is the "unison" motion where both diaphragms 40A and 40B move simultaneously in the same direction. The motion transmitting assembly is thus attached to both diaphragms so that the motion transmitting assembly moves precisely with the diaphragms.

The motion transmitting assembly is capable of withstanding axial compression loads and thus the assembly supports the diaphragm under line pressures and the diaphragms sense or deflect only as a function of differential pressure on the two diaphragms. Thus if a line pressure of 1500 psi is present and the vortices cause a differential of 250 psi, the diaphragms only sense the differential and the assembly 42 shuttles back and forth as the pressure switches and the diaphragms move in the same direction. The diaphragms can be thin and sensitive because they detect deflections only from pressure differentials, not line pressure.

The motion transmitting assembly 42 includes an aluminum spool assembly 43 which has a flange end 44 and a tubular section 45 extending from the flange 44. Flange 44 has a opening in the center, and a stainless steel button or pin 46 is passed through the opening. It should be noted that the end of the tube 45 opposite from flange 44 is open (no flange) in the initial manufacture stages. Stainless steel pin 46 can be inserted into the opening in the flange 44 on the interior of the tube 45 and then the end of the pin is spot welded directly to the diaphragm 40A as shown, to intimately mechanically connect the flange 44 and the diaphragm 40A as they are secured together. The spot welding can be done before the welds 41 around the diaphragms are made so that the diaphragm 40A is attached to the spool assembly 43 prior to the time that the diaphragm 40A is fastened to the intermediate housing or body section 27 of the flowmeter.

Figure 6:
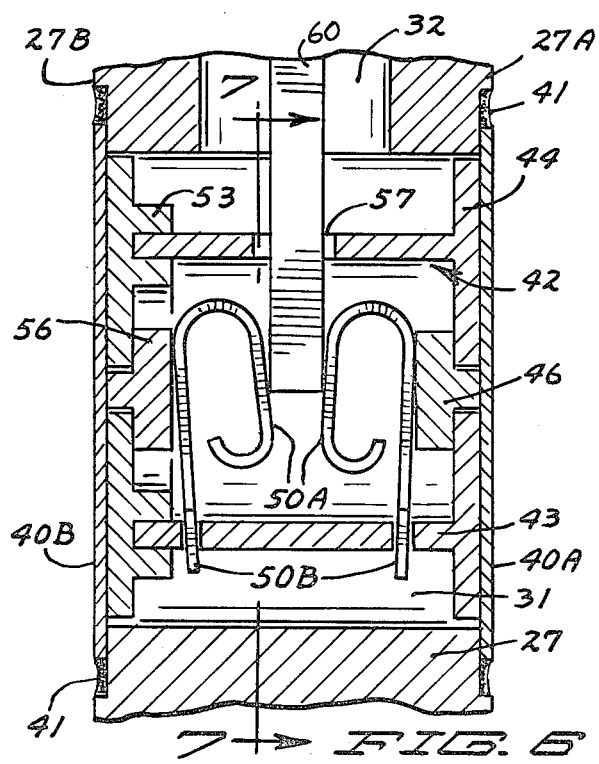
FIG. 6 is an enlarged sectional view of a diaphragm assembly and generally along the same line as FIG. 4 and shown in the lower portions of the sensor.

In order to transmit diaphragm motion to the sensor elements described subsequently, the tubular section 45 has small openings therein into which small motion transfer means comprising spring clips 50 are placed. The spring clips 50 as shown are flat springs formed into an "eye" portion and they have flat portions 50A that face each other as shown in FIGS. 4 and 6. The spring loading of the spring clips 50 is to force the portions 50A toward each other adjacent the center of bore 31. The spring clips 50 have small tabs 50B that fit into the openings in the tubular section 45. Spring clips 50 also allow for loose mechanical tolerance of other components of the sensor. Once the spring clips 50 are in place inside the tubular section 45 and the stainless steel button 46 has been spot welded to the diaphragm 40A, then this partial assembly can be slid into the bore 31. The recess surrounding the bore 31 on surface 27A will receive the outer edge of the diaphragm 40A.

It should be noted that the pin shank 46 is press fitted into the opening in the center of the flange 44 so that it will be retained in place and as it is spot welded to the diaphragm 40A. It is important to keep the spool section 43 from rotating primarily because the hole 57 must line up with bore 32 so that beam 60 can be inserted and make contact with springs 50. It must further be secured so that spool section 43 does not rotate thus preventing future contact between the edges of hole 57 and beam 60 and because it is made of aluminum and should not wear. It also should be spaced from the surface of bore 31. Thus, it is carried by the press fit to the button 46 which is spot welded to the diaphragm 40A.

After one side is inserted into the bar and the springs 50 have been inserted into the interior of the tubular section 45, a cap flange member will be placed on the opposite end of the tubular section 45. This cap flange is shown at 52, and has a boss 53 that is provided with a groove to recieve the end of the tubular section 45 so that the cap 52 may be forced over the end of the tubular section and is retained in place with a force fit or press fit.

The cap 52 also carries a stainless steel button indicated at 56, which is identical to the one shown in 46, and is press fitted into an opening in the center of the flange 52 just as the button 46 was press fitted into the opening in the flange 44.

The button 56 is spot welded to the second diaphragm 40B, and because the shank of the button 56 is pressed into the opening in cap flange 52 the cap flange is held securely on the diaphragm 40B.

In the assembly after the partial spool comprising the tubular section 45, flange 44 and the springs 50 are positioned into the bore 31 and diaphragm 40A is located in proper location against the provided face surfaces surrounding the bore 31. Cover 52 (with the attached diaphragm 40B) is then press fitted onto the end of the tube section 45 by inserting the end of the tubular section 45 into the groove defined in the boss 53. Force fitting of the cap 52 into place can be done prior to the welding of the diaphragm 40A into place if desired, and of course once the cap 52 is properly fitted the diaphragm 40B held by the pin 56 spot welded thereto, will also be properly positioned. The diaphragms 40A and 40B will be rotated so that a large opening 57 in the tubular section 45 will be properly aligned with the bore 32. The diaphragms 40A and 40B can then be welded to the intermediate housing or body section 27 hermetically sealed with this welding.

It can thus be seen that the stainless diaphragms have surfaces facing and in contact with the fluid, the differential pressure of which is being sensed, and interior portions which provide the motion transmitting assembly for transmitting motion from the diaphragms to lower portions of the sensor. The stainless steel buttons 46 and 56 provide for the mechanical connection to the diaphragms and securely hold the spool assembly 42 in place so that any movement of the diaphragms caused by differential pressure between them can be immediately transmitted to the actuator assembly. The diaphragms will shift under differential pressure as they are connected through the actuator assembly and will move side to side relative to the housing and in axial direction of bore 31. The spool assembly actually supports the diaphragms to insure they are not over stressed from high static pressures and yet will shift under pressure differentials.

The sensing of the shifting movement is done with a sensor beam indicated at 60 that is positioned in the bore 31 and has its upper end mounted suitably in a retaining head block holder 61 that rests in the larger bore portion 33 and on a shoulder surface 33A. The beam 60 thus is a cantilever beam because it will be grounded to the housing 27 through a clamping nut 62 that is threaded in the bore portion 34. The nut 62 has a collar 63 that bears against a washer 64 which in turn clamps the head block holder 61 tightly down against the surface shoulder 33A surrounding bore 32 and leading to bore 33.

Figure 7:
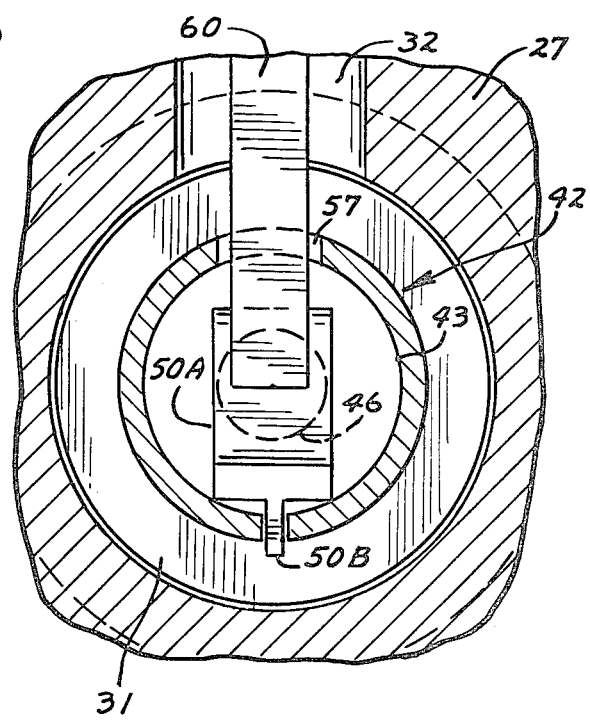
FIG. 7 is an enlarged sectional view taken as along line 7—7 in FIG. 6.

In order to properly orient the beam 60 and retain it in place rotationally, the washer 64 is fixed to the head block holder 61 and has a tab member 65 that slides in the slot 35 to positively position the beam 60 rotationally about its longitudinal axis so that its narrow width is oriented as shown in FIGS. 4 and 6 and the wider faces are oriented as shown in FIG. 7. When the beam 60 is slid into place, it will pass through the opening 57 in tubular section 43 of the already installed motion transmitting assembly 42 and the beam will slip down in between the spring sections 50A. The spring sections 50A will then resiliently load the beam and clamp the free end of the beam in place, also as shown in FIG. 7.

The tab 65 of washer 64 and slot 35 form an interlocking keyway and key for properly orienting the beam (and its head block holder) when the beam is inserted into the housing bore 33.

The beam 60 in the preferred embodiment is a piezoelectric bimorph, comprising a material that generates an AC voltage in response to an oscillatory force applied to bend the beam. The motion of the beam generates the voltage and polarity is a function of the direction of deflection. The voltage output, being a function of motion, will comprise an alternating voltage output as the beam bends back and forth from its reference (zero differential pressure) position. The beam is commercially available such as the Vernitron PZT-5A Monolithic Bimorph from Vernitron Piezoelectric Division, Bedford, Ohio.

A suitable lead 70 is provided from one side of the bimorph beam to sensing circuitry, and the other portion of the bimorph beam is connected with the lead 71 to the washer 65 and thus to ground through the flowmeter head member 13 and attachment to the pipe 10. Another means for grounding such as bonding the lead 71 to the shield of a coaxial cable, or to one of two wires in a shielded, twisted pair may be used.

It is thus readily apparent that the shifting (shuttling) of the diaphragms 40A and 40B under switching differentials in pressure thereon will cause a bending of the beam 60 and because the beam is a bimorph, piezoelectric crystal, the beam 60 will provide an alternating voltage output that is sensed through the leads 70 and 71 and which indicates frequency of switching of the vortices and thus the rate of flow. Because the frequency is the important factor to be sensed, the AC signals coming from the bimorph can readily give a frequency output to indicate the frequency of vortex formation, which indicates flow rate past the meter and thus the flow rate in the pipe 10.

It should be noted that the sensor 30 will sense differential pressures causing shifting of the diaphragms in any type of a housing, and the housing used for the diaphragms and the bending beam does not necessarily have to be part of a vortex flowmeter. One of the important features of course is that the beam 60 can be removed from its housing (body section 27) without affecting the rest of the sensor and without actually removing the vortex generating flowmeter from its position in the line carrying flow. Thin flexible diaphragms can be used, even though the sensor itself may be in a high static pressure environment because the motion transmitting assembly 42 comprising the aluminum tube section 43 with flange 44 and end cap flange 52 provides mechanical support to the diaphragms under high static pressures, but yet will shift (shuttle back and forth) under changes in differential in pressure. This results in an accurate, and reliable sensor where the diaphragms deflect from the pressure differential across the diaphragms and not from the full line pressure.

Figure 9:
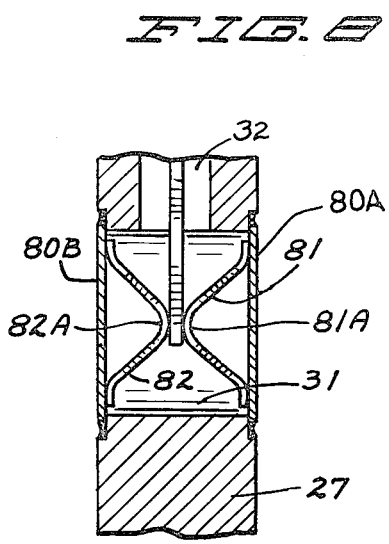
FIG. 9 is a fragmentary vertical sectional view of the sensor diaphragms showing a modified form of the invention.

In FIG. 9 a modified form of the motion transmitting assembly is utilized. In this form of the case, the housing section 27 has a bore 31 and a counterbore 32 and diaphragms 80A and 80B have bent, flat spring clips 81 and 82, respectively, spot welded thereto before they are welded into place in the bore 31 of the housing. The sensor beam 60 is then merely inserted between the spring clips, (which have center gripper sections 81A and 82A). The springs 81 and 82 have a suitable width such as the beam, for example, as shown in FIG. 7, but the spool is not used in this form which reduces the overall weight of the motion transmitting assembly. The free end of beam 60 is resiliently gripped and the beam is bent as described in relation to the first form of the invention.

However, the spool and flanges do have the advantage of providing support for the diaphragms against high static line pressures. The motion transmitting assembly can thus be a simple pair of springs to engage this sensor beam, or other members that couple the beam or its equivalent deflection sensing device directly and mechanically to the diaphragms.

The mechanical arrangement which provides motion only in response to differentials in pressure provides inherent rejection of common mode hydraulic noise. As such deviation from the line pressure is impressed on both diaphragms 40A and 40B and as the diaphragms are supported by the spool assembly, the diaphragms do not deflect responsive to such pressure on both diaphragms. Thus, such deviation will not cause sensor beam 60 to deflect as there is no motion of the spool assembly.

As mentioned previously, the deflecting beam of the sensor may be a thin fiber optic strand that provides an optical signal as a function of its bending and thus of diaphragm movement. These fibers may be very small and have little inertia so they are useful as beam sensors in small flowmeters where size is limited and the line pressure, and thus the differential pressure is quite low. Other optical sensing devices also may be used. The signal from the motion transmitting device may even be sensed by a sensor not in contact with the motion transmitting device.

What is claimed is:

1. A vortex flowmeter having a body forming a housing, the body having first and second surfaces which are subjected to pressure differentials representative of flow, separate diaphragm means positioned on the body and facing in the directions of said first and second surfaces respectively, for deflecting in response to pressure differentials at the first and second surfaces, fluidly isolated bore means defined in part by the separate diaphragm means, means in said bore means for transmitting deflecting motion of the separate diaphragm means caused by differentials in pressure on the separate diaphragm means comprising a tubular member having end faces engaging the respective separate diaphragm means and carrying compression loads between the diaphragm means, a beam member positioned in said bore means and extending laterally from the tubular member and having one end mounted with respect to said body at a location spaced from the means for transmitting deflecting motion, an opposite end of said beam member being coupled to the tubular member to thereby bend said beam member responsive to the movement of the tubular member as the separate diaphragm means deflect.

2. The flowmeter of claim 1, including means to couple the opposite end of the beam member to the tubular member comprising motion transmitting element means receiving the end portion of the beam member, and permitting sliding removal and replacement of the beam member in lateral direction from the tubular member.

3. The flowmeter of claim 1 wherein said bore means includes a laterally extending bore section in which the beam member is positioned, said flowmeter being adapted to be mounted in a fluid conduit, and having a portion sealingly mounted on the fluid conduit and opening to the exterior thereof, said bore section opening to the exterior of the fluid conduit to permit said beam member to be removed and replaced from the exterior of said fluid conduit.

4. A differential pressure sensor comprising a housing having first and second surfaces which are, in use, subjected to pressure differentials responsive to flow, a first bore in said housing having ends open to and providing a passageway between said first and second surfaces, separate diaphragm means comprising at least portions of said first and second surfaces, respectively and closing the ends of said first bore, a second bore opening to said first bore between said diaphragm means and extending outwardly from the first bore, said bores being closed to isolate said bores from fluid in which the sensor is used, bending motion sensing means mounted on said housing at location spaced from the first bore and communicating through said second bore to said first bore, a lightweight compression carrying tubular spool mounted in the first bore for carrying compression loads tending to move the diaphragm means toward each other, said tubular spool having end surfaces for supporting the respective diaphragm means and said tubular spool moving in the first bore as the separate diaphragm means both deflect in the same direction for transmitting motion signals from said diaphragm means, and means coupling the bending motion sensing means to the tubular spool to bend the bending motion sensing means and provide an output signal when differential in pressures cause said separate diaphragm means to deflect and move the tubular spool.

5. The apparatus as specified in claim 4 wherein said bending motion sensing means comprises a beam member extending through said second bore and having an end movable in the first bore to result in bending of the beam member to provide an output signal, said tubular spool having an aperture therein to permit the end of the beam member to extend into the interior of the tubular spool, and the means coupling being carried by the tubular spool.

6. The apparatus as specified in claim 5 wherein said housing comprises a portion of a vortex generating flowmeter and said first and second surfaces and the diaphragm means are generally parallel to the flow direction, and means upstream from said housing to cause pressure differentials to be present adjacent the first and second housing surfaces.

7. The apparatus as specified in claim 4 wherein said separate diaphragm means comprise a pair of thin flexible wall diaphragms hermetically sealed relative to the housing.

8. The apparatus as specified in claim 4 wherein said beam member comprises a piezoelectric bimorph beam.

9. A differential pressure sensor for use in connection with a vortex flowmeter comprising a vortex generating body having generally parallel spaced side surfaces which are generally parallel to the direction of flow to be measured, the differential pressure sensor comprising a housing portion having a first bore, a pair of deflectable diaphragms for hermetically sealing said first bore at the opposite ends of the first bore, the diaphragms having outer surfaces opening to the respective side surfaces of a vortex generating body in use so as to be subjected to vortices formed in the flow past the vortex flowmeter, a counterbore formed in said housing and extending laterally from said first bore and extending to the exterior of the housing portion, said first bore and counterbore both being fluidly isolated from the fluid which is to be measured for flow, tubular compression carrying means in said first bore having opposite end surfaces engaging both of said diaphragms for supporting said diaphragms from movement toward each other and moving in the first bore in response to deflecting motions of the diaphragms in unison caused by differential pressure being present on the outer surfaces of the respective diaphragms, and motion sensing means mounted in said counterbore responsive to movements of said tubular compression carrying means including means to provide a signal as a known function of the motions of said tubular compression carrying means from a reference rest position.

10. The differential pressure sensor specified in claim 9 wherein said means to sense motion comprises a beam member mounted on said flowmeter at a first end thereof and having a free end cantilevered from its mounting and extending through said counterbore and into said first bore and the means to transmit engaging the free end of said beam member and causing bending of said beam member when the diaphragms shift under differential pressures.

11. The differential pressure sensor of claim 9 wherein the counterbore opens to a larger diameter bore portion in the housing at a position spaced from the first bore and has a mounting head, said motion sensing means comprising a beam having one end mounted on the mounting head and the other end coupled to the tubular compression carrying means, said mounting head fitting into the larger diameter bore portion, and means to clamp the mounting head relative to the housing with the mounting head within the larger diameter bore portion.

12. The differential pressure sensor of claim 11 and means forming an interlocking key and keyway to orient the mounting head in only one position in the larger diameter bore portion.

13. A vortex flowmeter having a body forming a housing having first and second surfaces which are subjected to pressure differentials, separate diaphragms forming continuations of said first and second surfaces respectively, for deflecting in response to pressure at the first and second surfaces, means in said housing for transmitting deflecting motion of the diaphragms caused by differentials in pressure on the separate diaphragms comprising a pair of flat springs each coupled to one of the diaphragms, so each spring moves, respectively, with its respective diaphragm, a beam member having one end mounted on said body spaced from the means for transmitting deflecting motion, an opposite end of said beam member extending to position between the springs, said springs each having portions extending toward and bearing against the opposite end of the beam member to thereby cause said beam member to bend when differential in pressures at the first and second surfaces cause said diaphragms to deflect.

14. A differential pressure sensor for use in connection with a vortex flowmeter comprising a vortex generating body having a portion forming a housing, said body having generally parallel spaced side surfaces which are generally parallel to the direction of flow to be measured, a first bore formed through said housing and opening to said parallel side surfaces, a pair of deflectable diaphragms hermetically sealing said first bore adjacent the opposite ends of the first bore whereby the diaphragms have outer surfaces responsive to vortices formed in the flow past the vortex flowmeter body, a counterbore formed in said housing and extending laterally from said first bore, a beam member having a first end mounted with respect to said housing and having a free end cantilevered from its mounting and extending through said counterbore and into said first bore, said beam being bendable to permit the free end to move, a tubular spool member slidably mounted in the first bore and having opposite end flanges, each of said flanges resting against a respective one of said diaphragms, an opening in said tubular spool member, the free end portion of said beam member passing through said opening, and spring means carried by said tubular spool member and engaging the free end portion of said beam member to resiliently transmit motions in opposite directions from a reference rest position of the diaphragms to the free end portion of said beam member as the diaphragms deflect in unison responsive to differentials in pressure on the outer surfaces of the diaphragms.

15. The differential pressure sensor as specified in claim 14 wherein said spool member has mechanical elements fixed to said diaphragms and to the end flanges to support the end flanges on said diaphragms, respectively.

16. A differential pressure sensor for use in connection with a vortex flowmeter comprising a vortex generating body having a portion forming a housing, said body having generally parallel spaced side surfaces which are generally parallel to the direction of flow to be measured, a first bore formed through said housing and opening to said parallel side surfaces, deflectable diaphragms hermetically sealing said first bore at the opposite ends of the first bore whereby the diaphragms have outer surfaces subjected to vortices formed in the flow past the vortex flowmeter, a counterbore formed in said housing and extending laterally from said first bore and extending to the exterior of the body, said bores being fluidly isolated from the fluid which is to be measured for flow, a pair of leaf spring members, each leaf spring being positioned in the first bore and mechanically coupled to one of said diaphragms and extending from the respective diaphragm toward the center of the first bore, said leaf spring members moving in response to deflecting motions of the diaphragms in unison caused by differential pressure being present on the outer surfaces of the respective diaphragms, and sensing means responsive to said means to transmit, located in said counterbore, including means to provide a signal as a known function of the unison motions of said diaphragms from a reference rest position, said sensing means comprising a beam member mounted on the body at a first end and having a free end cantilevered from the first end and extending through said counterbore and into the first bore, said leaf type spring members being mechanically moved upon deflection of said diaphragms from a rest position under differential pressure, said leaf spring members providing a spring force resiliently clamping the free end of said beam member to cause the beam member to bend as the diaphragms move in unison.

* * * * *